Patented Apr. 7, 1925.

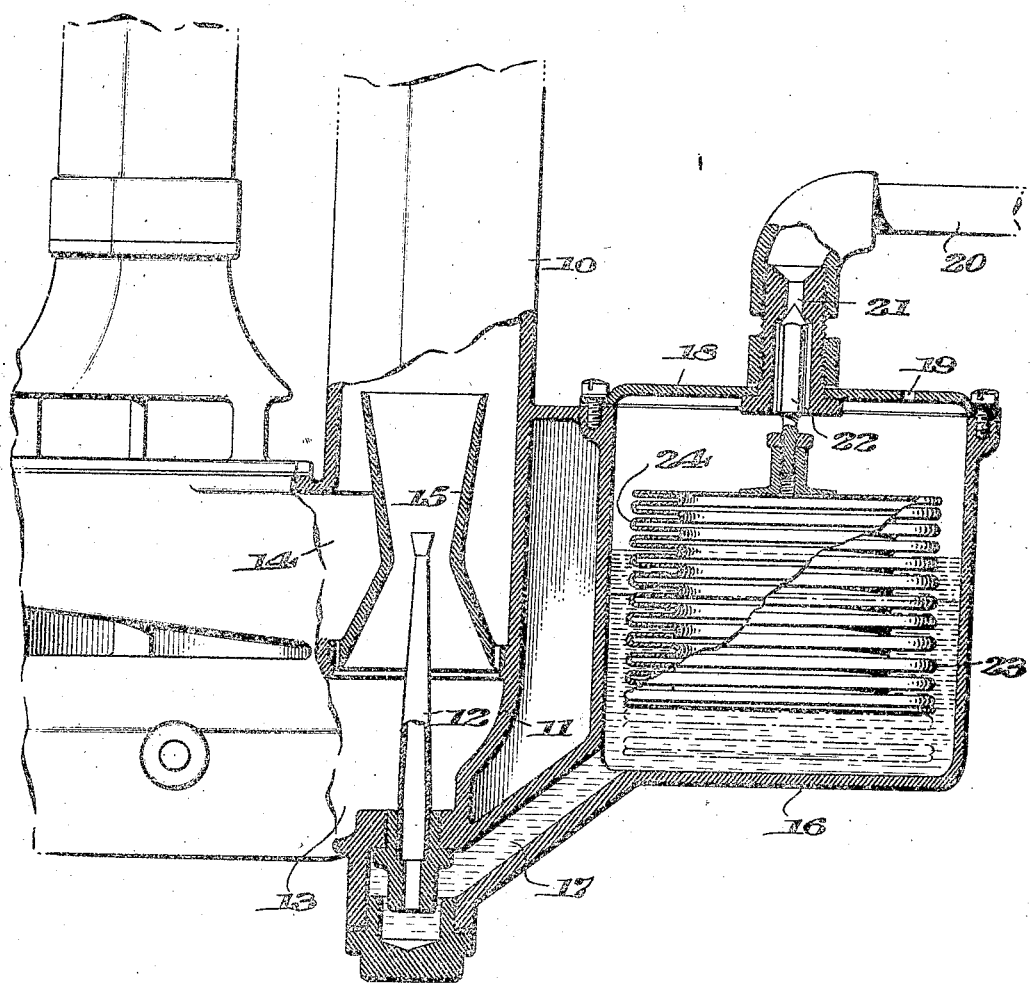

1,532,291

UNITED STATES PATENT OFFICE.

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN.

FLOAT-VALVE MEANS.

Application filed December 9, 1920. Serial No. 429,586.

*To all whom it may concern:*

Be it known that I, LIONEL M. WOOLSON, a citizen of the United States, and resident of Detroit, Wayne County, State of Michigan, have invented certain new and useful Improvements in Float-Valve Means, of which the following is a specification.

This invention relates to the mixture forming means of internal combustion engines. In engines used in flying it is necessary to have some sort of altitude control for the mixture forming means in order that the correct ratio of air to gas may be maintained as the atmospheric pressure becomes less. It is one of the objects of the present invention to accomplish this purpose automatically.

The invention comprises means in the float chamber of a carburetor for lowering the liquid level therein as the higher altitudes are reached. As shown this means is in the form of an expansible float sealed with air at atmospheric pressure at sea level or thereabouts and controlling the admission of fuel to the chamber.

Referring to the drawings, the figure represents the intake pipe and carburetor of an internal combustion engine made in accordance with the invention. The intake pipe is indicated at 10 and forming a continuation thereof is a carburetor 11, having a fuel nozzle 12, a main air intake 13 and an auxiliary air intake 14. An air tube 15 of Venturi form surrounds the nozzle 12 and forms the mixing tube through which air passes from the main air intake.

Arranged to supply liquid fuel as gasoline to the nozzle 12, is a float chamber 16 the connection to the nozzle being through a passage 17. The chamber has a cover 18 vented at 19, and a pipe 20 brings the fuel to the chamber through a port 21.

A valve 22 controls the port 21, and a float 23 is connected to the valve to close it as the lever of liquid in the chamber reaches a predetermined point. As the fuel is drawn out of the chamber through the nozzle 12 by the operation of the engine, the level lowers and with it the float thus causing the valve 22 to open to admit more fuel up to the level again.

The float 23 is preferably formed of thin sheet metal and its side walls are corrugated as shown at 24 so that the float may expand. In practice it is sealed with air at atmospheric pressure at or approximately at sea level, and its connection to the valve 22 is so adjusted that the level in the chamber will be normally maintained slightly below the top of the nozzle 12. When higher altitudes are reached atmospheric pressure, vented to the float chamber through the opening 19, is less than the pressure in the float 23 and the latter automatically expands and consequently closes the valve 22 at a lower liquid level. The lower level in the chamber and nozzle reduces the percentage of liquid fuel that would otherwise be drawn to the engine through the carburetor. Of course the float will again contract as atmospheric pressure increases on the descent to lower levels.

It will be understood that various forms of the invention other than those described above may be used without departing from the spirit or scope of the invention.

Having thus described my invention, what I claim and desire to secure by Letters Patent is:

1. In an internal combustion engine, the combination with a carburetor having a float chamber, of an expansible float of corrugated sheet metal in said chamber.

2. In an internal combustion engine, the combination with a carburetor having a float chamber, and a valve for controlling the entrance of fuel thereto, and a corrugated expansible float controlling said valve.

3. A carburetor comprising a float chamber having a valve, and float means controlling said valve operable by atmospheric pressure to maintain a higher level in the chamber at sea level than at higher altitudes.

4. A carburetor comprising a float chamber having a valve, and float means connected to said valve for varying the liquid level in the chamber with variations in atmospheric pressure.

5. A carburetor comprising a fuel nozzle, an air tube surrounding said nozzle, a float chamber connected to said nozzle, a valve for said chamber, and a float for controlling said valve to maintain the level in the float chamber below the upper end of said nozzle, said float being formed to automatically expand with a decrease in atmospheric pressure and thereby lower the level in said float chamber.

6. A carburetor float having expansible side walls, responsive to atmospheric pressure thereon.

7. A carburetor float having corrugated side walls permitting expansion of the float in response to changes in atmospheric pressure on the carburetor.

8. A carburetor comprising a fuel nozzle, a float chamber connected to said nozzle and communicating with the atmosphere, an inlet valve for said float chamber, and a corrugated metal float of variable volume in the float chamber, whereby variations in atmospheric pressure in the chamber produce variations in volume of the float to actuate the inlet valve.

In testimony whereof I affix my signature.

LIONEL M. WOOLSON.